Sept. 4, 1928.  1,683,350
G. N. HEIN
LOCK FOR HYPODERMIC NEEDLES AND THE LIKE
Filed Oct. 4, 1926
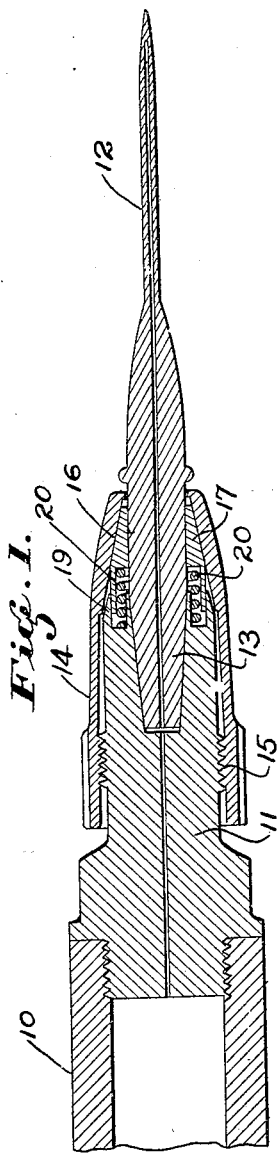
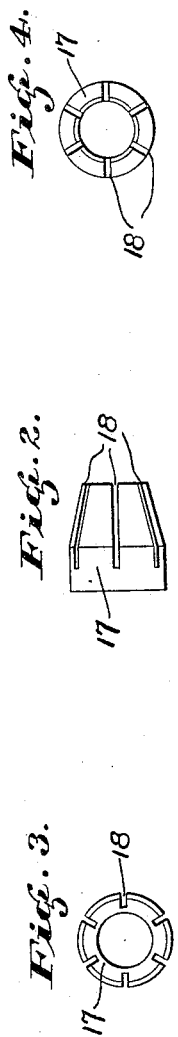
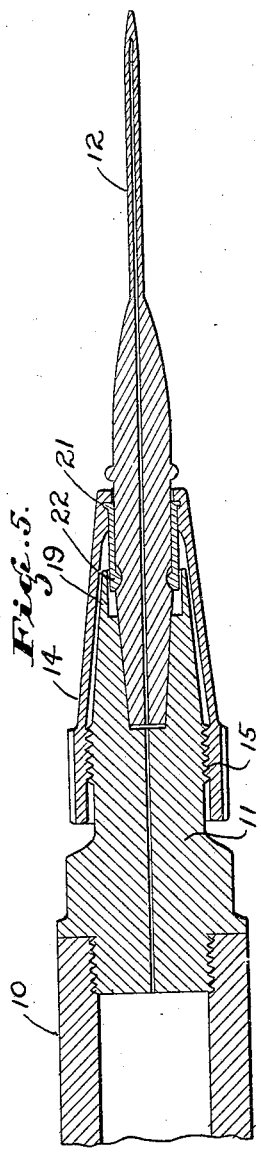
INVENTOR.
George N. Hein.
BY
Townsend, Loftus & Abbott
ATTORNEYS.

Patented Sept. 4, 1928.

1,683,350

UNITED STATES PATENT OFFICE.

GEORGE N. HEIN, OF SAN FRANCISCO, CALIFORNIA.

LOCK FOR HYPODERMIC NEEDLES AND THE LIKE.

Application filed October 4, 1926. Serial No. 139,246.

This invention relates to hypodermic syringes and similar devices, wherein a needle or the like, having a slip joint connection with the syringe, must be locked in position by means capable of quick and easy attachment and detachment. Hypodermic needles usually have a long, tapered stem to enter a tapered socket in the syringe barrel, and means are provided for locking the needle in place. Prior locking means are not capable of quick and easy manipulation, sometimes requiring a wrench, and frequently necessitating complete removal from the syringe in order to release the needle.

It is the object of the present invention to provide a locking device capable of seating and unseating the needle and positively retaining the same in place with a minimum of time and effort. In the present form the locking device can be quickly and easily operated without a wrench or special tool, and is capable of seating and unseating the needle upon a slight turn, without the necessity of entirely removing the locking device from the syringe.

In the accompanying drawings,

Fig. 1 shows a central longitudinal sectional view of a needle and syringe equipped with one form of my invention;

Fig. 2 shows a side elevation of the clutch ring employed in the locking device;

Fig. 3 shows an end view of the ring;

Fig. 4 shows an end view, viewing the ring from the opposite end;

Fig. 5 shows a central longitudinal sectional view of a syringe and needle equipped with a modified form of my locking device;

Fig. 6 shows a side elevation of the clutch ring employed in the device of Fig. 5;

Figs. 7 and 8 show opposite end views of the clutch ring of Fig. 6.

In the drawings I show a syringe barrel 10 having a nipple 11 formed with a tapered, smooth-bore socket, to receive a needle 12. This needle has a tapered base or stem 13 adapted to enter the socket in the nipple and form a slip-joint therewith.

As a means of locking the needle in place, I show in Fig. 1 a sleeve 14 surrounding the nipple and secured to the latter by threads 15. The outer end of the sleeve is beveled as shown at 16. This beveled end of the sleeve encloses a clutch ring 17 which is also beveled at one end to correspond with the beveled surface 16. The clutch ring is made of spring metal and is provided with longitudinal slots 18, so as to permit of expansion and contraction radially. The inner diameter of the clutch ring is of a size to freely receive the base 13 of the needle. The inner end of the clutch ring is adapted to fit within a lip 19 on the end of the nipple 11, and the co-operating ends of the clutch and nipple are reamed out to provide a space for a helical spring 20.

In operation, when the sleeve is slacked off slightly the beveled end of the clutch ring will expand and permit the needle base to be easily inserted. Then when the sleeve is given a slight turn in a direction to draw it towards the syringe barrel, the beveled surface 16 will cause the clutch ring to be contracted and tightly grip the needle base. At the same time, the needle will be forced tightly into its socket with a slight turn or twist, so as to wipe the slip joint. The function of the helical spring 20 is to push the clutch ring outwardly and insure instant release of the needle when the sleeve is slacked off.

In Fig. 5 a different form of sleeve and clutch are employed. Here the sleeve has a groove at its outer end, into which a bead 21 on the clutch ring is seated. The opposite end of the clutch ring is provided with inwardly extending projections 22 to co-operate with depressions in the base of the needle. Due to the slotted spring metal in the clutch ring, the latter will act as a snap fastener when not restrained; so that the needle may be inserted or removed. After the needle is inserted into the clutch ring, the sleeve is rotated so as to draw the clutch ring within the projecting lip 19 of the nipple, and thus lock the projections 22 in place within the depression in the needle. The needle can only be withdrawn when the sleeve is slacked off a sufficient distance to permit the clutch ring to clear the lip 19 on the nipple.

Various changes in the construction of the several parts herein shown may be employed, without departing from the spirit of my invention, as disclosed in the appended claims.

Having thus described my invention, what I claim as new and desire to secure by Letters Patent is:

1. In a syringe, a nipple having a socket, and a needle having a base to fit within the socket of a locking device comprising a sleeve threaded onto the nipple, a clutch ring of slotted spring metal within the sleeve and surrounding the base of the needle, and means whereby, when the sleeve is screwed onto the nipple, the clutch ring will be compressed into locking engagement with the stem.

2. In a syringe having a nipple formed with a socket and a needle having a base to enter said socket, a locking device comprising a sleeve threaded onto the nipple, a clutch ring within the sleeve, said clutch ring being formed of slotted spring metal and having a beveled surface co-operating with a beveled surface on the sleeve, whereby when the sleeve is screwed onto the nipple, the clutch ring will be compressed so as to tightly grip the base of the needle.

3. In a syringe having a nipple formed with a socket and a needle having a base to enter said socket, a locking device for the needle, comprising a sleeve threaded onto the nipple, a clutch ring formed of slotted spring metal within the sleeve and surrounding the base of the needle, said clutch ring having a beveled surface co-operating with a beveled surface on the sleeve, a projecting lip on the end of the nipple within which the adjacent end of the clutch ring enters, and a spring between the ring and nipple, acting to force the ring outwardly.

4. In a locking device for co-operation with a hypodermic syringe, a needle comprising a sleeve adapted to be threaded onto the nipple of the syringe and having a beveled internal surface at its outer end and a clutch ring carried within the sleeve and also provided with a beveled surface to co-operate with the beveled surface on the sleeve, said clutch ring being formed of slotted spring metal and having an inner diameter of a size to freely receive the base of the needle.

GEORGE N. HEIN.